United States Patent
Fermann

(10) Patent No.: US 6,275,512 B1
(45) Date of Patent: Aug. 14, 2001

(54) MODE-LOCKED MULTIMODE FIBER LASER PULSE SOURCE

(75) Inventor: Martin E. Fermann, Ann Arbor, MI (US)

(73) Assignee: Imra America, Inc., Ann Arbor, MI (US)

( * ) Notice: Subject to any disclaimer, the term of this patent is extended or adjusted under 35 U.S.C. 154(b) by 0 days.

(21) Appl. No.: 09/199,728

(22) Filed: Nov. 25, 1998

(51) Int. Cl.[7] .................................................. H01S 3/30
(52) U.S. Cl. ...................... 372/6; 372/6; 372/18; 372/5; 372/11; 372/26; 372/31; 372/102; 372/22
(58) Field of Search ................... 372/6, 18, 19, 372/5, 11, 26, 31, 102, 22, 27, 28; 385/28

(56) References Cited

U.S. PATENT DOCUMENTS

| | | | |
|---|---|---|---|
| 4,835,778 | * | 5/1989 | Kafka et al. ............................. 372/6 |
| 5,187,759 | * | 2/1993 | DiGiovanni et al. ................... 385/27 |
| 5,450,427 | * | 9/1995 | Fermann et al. ....................... 378/18 |
| 5,627,848 | * | 5/1997 | Fermann et al. ....................... 372/18 |
| 5,689,519 | * | 11/1997 | Fermann et al. ....................... 372/18 |
| 5,818,630 | * | 10/1998 | Fermann et al. ..................... 359/341 |
| 5,867,304 | * | 2/1999 | Galvanauskas et al. ............. 359/333 |
| 5,880,877 | * | 3/1999 | Fermann et al. ..................... 359/341 |
| 6,014,249 | * | 1/2000 | Fermann et al. ..................... 359/341 |
| 6,072,811 | * | 6/2000 | Fermann et al. ....................... 372/11 |

* cited by examiner

*Primary Examiner*—Frank G. Font
*Assistant Examiner*—Delma R. Flores Ruiz
(74) *Attorney, Agent, or Firm*—Knobbe, Martens, Olson & Bear LLP

(57) ABSTRACT

A laser utilizes a cavity design which allows the stable generation of high peak power pulses from mode-locked multi-mode fiber lasers, greatly extending the peak power limits of conventional mode-locked single-mode fiber lasers. Mode-locking may be induced by insertion of a saturable absorber into the cavity and by inserting one or more mode-filters to ensure the oscillation of the fundamental mode in the multi-mode fiber. The probability of damage of the absorber may be minimized by the insertion of an additional semiconductor optical power limiter into the cavity.

4 Claims, 11 Drawing Sheets

Free-space coupling

Spliced fibers

MM to SM taper

MODE-LOCKED MULTIMODE FIBER LASER PULSE SOURCE

FIELD OF THE INVENTION

The present invention relates to the amplification of single mode light pulses in multi-mode fiber amplifiers, and more particularly to the use of multi-mode amplifying fibers to increase peak pulse power in a mode-locked laser pulse source used for generating ultra-short optical pulses.

BACKGROUND OF THE INVENTION
Background Relating to Optical Amplifiers

Single-mode rare-earth-doped optical fiber amplifiers have been widely used for over a decade to provide diffraction-limited optical amplification of optical pulses. Because single mode fiber amplifiers generate very low noise levels, do not induce modal dispersion, and are compatible with single mode fiber optic transmission lines, they have been used almost exclusively in telecommunication applications.

The amplification of high peak-power pulses in a diffraction-limited optical beam in single-mode optical fiber amplifiers is generally limited by the small fiber core size that needs to be employed to ensure single-mode operation of the fiber. In general the onset of nonlinearities such as self-phase modulation lead to severe pulse distortions once the integral of the power level present inside the fiber with the propagation length exceeds a certain limiting value. For a constant peak power P inside the fiber, the tolerable amount of self-phase modulation $\Phi_{nl}$ is given by $$\Phi_{nl} = \frac{2\pi n_2 P L}{\lambda A} \leq 5,$$

where A is the area of the fundamental mode in the fiber, $\lambda$ is the operation wavelength, L is the fiber length and $n_2 = 3.2 \times 10^{-20}$ m$^2$/W is the nonlinear refractive index in silica optical fibers.

As an alternative to single-mode amplifiers, amplification in multi-mode optical fibers has been considered. However, in general, amplification experiments in multi-mode optical fibers have led to non-diffraction-limited outputs as well as unacceptable pulse broadening due to modal dispersion, since the launch conditions into the multi-mode optical fiber and mode-coupling in the multi-mode fiber have not been controlled.

Amplified spontaneous emission in a multi-mode fiber has been reduced by selectively exciting active ions close to the center of the fiber core or by confining the active ions to the center of the fiber core. U.S. Pat. No. 5,187,759, hereby incorporated herein by reference. Since the overlap of the low-order modes in a multi-mode optical fiber is highest with the active ions close to the center of the fiber core, any amplified spontaneous emission will then also be predominantly generated in low-order modes of the multi-mode fiber. As a result, the total amount of amplified spontaneous emission can be reduced in the multi-mode fiber, since no amplified spontaneous emission is generated in high-order modes.

As an alternative for obtaining high-power pulses, chirped pulse amplification with chirped fiber Bragg gratings has been employed. One of the limitations of this technique is the relative complexity of the set-up.

More recently, the amplification of pulses to peak powers higher than 10 KW has been achieved in multi-mode fiber amplifiers. See U.S. Pat. No. 5,818,630, entitled Single-Mode Amplifiers and Compressors Based on Multi-Mode Fibers, assigned to the assignee of the present invention, and hereby incorporated herein by reference. As described therein, the peak power limit inherent in single-mode optical fiber amplifiers is avoided by employing the increased area occupied by the fundamental mode within multi-mode fibers. This increased area permits an increase in the energy storage potential of the optical fiber amplifier, allowing higher pulse energies before the onset of undesirable non-linearities and gain saturation. To accomplish this, that application describes the advantages of concentration of the gain medium in the center of the multi-mode fiber so that the fundamental mode is preferentially amplified. This gain-confinement is utilized to stabilize the fundamental mode in a fiber with a large cross section by gain guiding.

Additionally, that reference describes the writing of chirped fiber Bragg gratings onto multi-mode fibers with reduced mode-coupling to increase the power limits for linear pulse compression of high-power optical pulses. In that system, double-clad multi-mode fiber amplifiers are pumped with relatively large-area high-power semiconductor lasers. Further, the fundamental mode in the multi-mode fibers is excited by employing efficient mode-filters. By further using multi-mode fibers with low mode-coupling, the propagation of the fundamental mode in multi-mode amplifiers over lengths of several meters can be ensured, allowing the amplification of high-power optical pulses in doped multi-mode fiber amplifiers with core diameters of several tens of microns, while still providing a diffraction limited output beam. That system additionally employed cladding pumping by broad area diode array lasers to conveniently excite multi-mode fiber amplifiers.

Background Relating to Modelocked Lasers

Both actively modelocked lasers and passively modelocked lasers are well known in the laser art. For example, compact modelocked lasers have been formed as ultrashort pulse sources using single-mode rare-earth-doped fibers. One particularly useful fiber pulse source is based on Kerr-type passive modelocking. Such pulse sources have been assembled using widely available standard fiber components to provide pulses at the bandwidth limit of rare-earth fiber lasers with GigaHertz repetition rates.

Semiconductor saturable absorbers have recently found applications in the field of passively modelocked, ultrashort pulse lasers. These devices are attractive since they are compact, inexpensive, and can be tailored to a wide range of laser wavelengths and pulsewidths. Quantum well and bulk semiconductor saturable absorbers have also been used to modelock color center lasers.

A saturable absorber has an intensity-dependent loss l. The single pass loss of a signal of intensity I through a saturable absorber of thickness d may be expressed as $$l = 1 - \exp(-\alpha d)$$

in which $\alpha$ is the intensity dependent absorption coefficient given by:

$$\alpha(I) = \alpha_0 / (1 + I/I_{SAT})$$

Here $\alpha_0$ is the small signal absorption coefficient, which depends upon the material in question. $I_{SAT}$ is the saturation intensity, which is inversely proportional to the lifetime ($\tau_A$) of the absorbing species within the saturable absorber. Thus, saturable absorbers exhibit less loss at higher intensity.

Because the loss of a saturable absorber is intensity dependent, the pulse width of the laser pulses is shortened as they pass through the saturable absorber. How rapidly the pulse width of the laser pulses is shortened is proportional to $|dq_0/dI|$, in which $q_0$ is the nonlinear loss:

$q_o = l(I) - l(I=0)$ $l(I=0)$ is a constant ($=1-\exp(-_o d)$) and is known as the insertion loss. As defined herein, the nonlinear loss $q_o$ of a saturable absorber decreases (becomes more negative) with increasing intensity I. $|dq_o/dI|$ stays essentially constant until I approaches $I_{SAT}$ becoming essentially zero in the bleaching regime, i.e., when $I>>I_{SAT}$.

For a saturable absorber to function satisfactorily as a modelocking element, it should have a lifetime (i.e., the lifetime of the upper state of the absorbing species), insertion loss l(I=0), and nonlinear loss $q_o$ appropriate to the laser. Ideally, the insertion loss should be low to enhance the laser's efficiency, whereas the lifetime and the nonlinear loss $q_o$ should permit self-starting and stable cw modelocking. The saturable absorber's characteristics, as well as laser cavity parameters such as output coupling fraction, residual loss, and lifetime of the gain medium, all play a role in the evolution of a laser from startup to modelocking.

As with single-mode fiber amplifiers, the peak-power of pulses from mode-locked single-mode lasers has been limited by the small fiber core size that has been employed to ensure single-mode operation of the fiber. In addition, in mode-locked single-mode fiber lasers, the roundtrip nonlinear phase delay also needs to be limited to around $\pi$ to prevent the generation of pulses with a very large temporally extended background, generally referred to as a pedestal. For a standard mode-locked single-mode erbium fiber laser operating at 1.55 $\mu$m with a core diameter of 10 $\mu$m and a round-trip cavity length of 2 m, corresponding to a pulse repetition rate of 50 MHz, the maximum oscillating peak power is thus about 1 KW.

The long-term operation of mode-locked single-mode fiber lasers is conveniently ensured by employing an environmentally stable cavity as described in U.S. Pat. No. 5,689,519, entitled Environmentally Stable Passively Modelocked Fiber Laser Pulse Source, assigned to the assignee of the present invention, and hereby incorporated herein by reference. The laser described in this reference minimizes environmentally induced fluctuations in the polarization state at the output of the single-mode fiber. In the described embodiments, this is accomplished by including a pair of Faraday rotators at opposite ends of the laser cavity to compensate for linear phase drifts between the polarization eigenmodes of the fiber.

Recently the reliability of high-power single-mode fiber lasers passively mode-locked by saturable absorbers has been greatly improved by implementing nonlinear power limiters by insertion of appropriate semiconductor two-photon absorbers into the cavity, which minimizes the peak power of the damaging Q-switched pulses often observed in the start-up of mode-locking and in the presence of misalignments of the cavity. See U.S. patent application Ser. No. 09/149,369, filed on Sep. 8, 1998, is now an U.S. Pat. No. 6,158,031 filed on Dec. 5, 2000 entitled Resonant Fabry-Perot Semiconductor Saturable Absorbers and Two-Photon Absorption Power Limiters, assigned to the assignee of the present invention, and hereby incorporated herein by reference.

To increase the pulse energy available from mode-locked single-mode fiber lasers the oscillation of chirped pulses inside the laser cavity has been employed. M. Hofer et al., Opt. Lett., vol. 17, page 807–809. As a consequence the pulses are temporally extended, giving rise to a significant peak power reduction inside the fiber laser. However, the pulses can be temporally compressed down to approximately the bandwidth limit outside the laser cavity. Due to the resulting high peak power, bulk-optic dispersive delay lines have to be used for pulse compression. For neodymium fiber lasers, pulse widths of the order of 100 fs can be obtained.

The pulse energy from mode-locked single-mode fiber lasers has also been increased by employing chirped fiber gratings. The chirped fiber gratings have a large amount of negative dispersion, broadening the pulses inside the cavity dispersively, which therefore reduces their peak power and also leads to the oscillation of high-energy pulses inside the single-mode fiber lasers.

See U.S. Pat. No. 5,450,427, entitled Technique for the Generation of Optical Pulses in Mode-Locked Lasers by Dispersive Control of the Oscillation Pulse Width, and U.S. Pat. No. 5,627,848, entitled Apparatus for Producing Femtosecond and Picosecond Pulses from Fiber Lasers Cladding Pumped with Broad Area Diode Laser Arrays, both of which are assigned to the assignee of the present invention and hereby incorporated herein by reference. In these systems, the generated pulses are bandwidth-limited, though the typical oscillating pulse widths are of the order of a few ps.

However, though the dispersive broadening of the pulse width oscillating inside a single-mode fiber laser cavity does increase the oscillating pulse energy compared to a 'standard' soliton fiber laser, it does not increase the oscillating peak power. The maximum peak power generated with these systems directly from the fiber laser is still limited to around 1 KW.

Another highly integratable method for increasing the peak power of mode-locked lasers is based on using chirped periodically poled LiNbO3 (chirped PPLN). Chirped PPLN permits simultaneous pulse compression and frequency doubling of an optically chirped pulse. See U.S. patent application No. 08/845,410, filed on Apr. 25, 1997, is now an U.S. Pat. No. 5,867,304 filed on Feb. 2, 1999 entitled Use of Aperiodic Quasi-Phase-Matched Gratings in Ultrashort Pulse Sources, assigned to the assignee of the present application, and hereby incorporated herein by reference. However, for chirped PPLN to produce pulse compression from around 3 ps to 300 fs and frequency doubling with high conversion efficiencies, generally peak powers of the order of several KW are required. Such high peak powers are typically outside the range of mode-locked single-mode erbium fiber lasers.

Broad area diode laser arrays have been used for pumping of mode-locked single-mode fiber lasers, where very compact cavity designs were possible. The pump light was injected through a V-groove from the side of double-clad fiber, a technique typically referred to as side-pumping. However, such oscillator designs have also suffered from peak power limitations due to the single-mode structure of the oscillator fiber.

It has also been suggested that a near diffraction-limited output beam can be obtained from a multi-mode fiber laser when keeping the fiber length shorter than 15 mm and selectively providing a maximum amount of feedback for the fundamental mode of the optical fiber. "Efficient laser operation with nearly diffraction-limited output from a diode-pumped heavily Nd-doped multimode fiber", Optics Letters, Vol. 21, pp. 266–268 (1996) hereby incorporated herein by reference. In this technique, however, severe mode-coupling has been a problem, as the employed multimode fibers typically support thousands of modes. Also, only an air-gap between the endface of the multi-mode fiber and a laser mirror has been suggested for mode-selection. Hence, only very poor modal discrimination has been obtained, resulting in poor beam quality.

While the operation of optical amplifiers, especially in the presence of large seed signals, is not very sensitive to the presence of spurious reflections, the stability of mode-locked lasers critically depends on the minimization of spurious reflections. Any stray reflections produce sub-cavities inside an oscillator and result in injection signals for the cw operation of a laser cavity and thus prevent the onset of mode-locking. For solid-state FabryPerot cavities a suppression of intra-cavity reflections to a level <<1% (in intensity) is generally believed to be required to enable the onset of mode-locking.

The intra-cavity reflections that are of concern in standard mode-locked lasers can be thought of as being conceptually equivalent to mode-coupling in multi-mode fibers.

Any mode-coupling in multi-mode fibers clearly also produces a sub-cavity with a cw injection signal proportional to the amount of mode-coupling. However, the suppression of mode-coupling to a level of <<1% at any multi-mode fiber discontinuities is very difficult to achieve. Due to optical aberrations, even well corrected optics typically allow the excitation of the fundamental mode in multi-mode fibers only with maximum efficiency of about 95%. Therefore to date, it has been considered that mode-locking of a multi-mode fiber is impossible and no stable operation of a mode-locked multi-mode fiber laser has yet been demonstrated.

SUMMARY OF THE INVENTION

This invention overcomes the foregoing difficulties associated with peak power limitations in modelocked lasers, and provides a mode-locked multi-mode fiber laser.

This laser utilizes cavity designs which allow the stable generation of high peak power pulses from mode-locked multi-mode fiber lasers, greatly extending the peak power limits of conventional mode-locked single-mode fiber lasers. Mode-locking may be induced by insertion of a saturable absorber into the cavity and by inserting one or more mode-filters to ensure the oscillation of the fundamental mode in the multi-mode fiber. The probability of damage of the absorber may be minimized by the insertion of an additional semiconductor optical power limiter into the cavity. The shortest pulses may also be generated by taking advantage of nonlinear polarization evolution inside the fiber. The long-term stability of the cavity configuration is ensured by employing an environmentally stable cavity. Pump light from a broad-area diode laser may be delivered into the multi-mode fiber by employing a cladding-pumping technique.

With this invention, a modelocked fiber laser may be constructed to obtain, for example, 360 fsec near-bandwidth-limited pulses with an average power of 300 mW at a repetition rate of 66.7 MHz. The peak power of these exemplary pulses is estimated to be about 6 KW.

BRIEF DESCRIPTION OF THE DRAWINGS

The following description of the preferred embodiments of the invention references the appended drawings, in which like elements bear identical reference numbers throughout.

DETAILED DESCRIPTION OF THE PREFERRED EMBODIMENT

Figure 1:
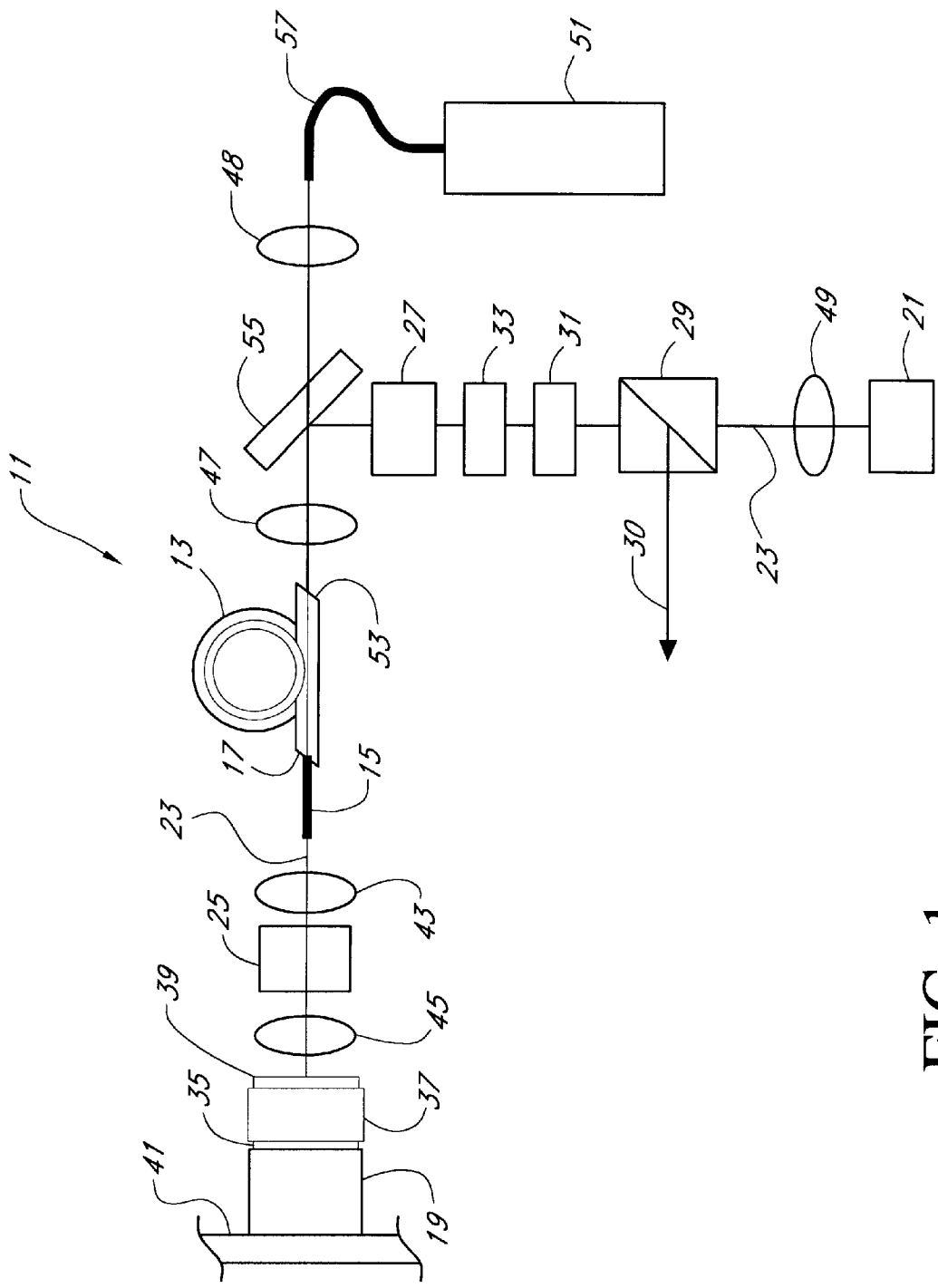
FIG. 1 is a schematic illustration showing the construction of a preferred embodiment of the present invention which utilizes end-pumping for injecting pump light into the multi-mode fiber.

FIG. 1A illustrates the mode-locked laser cavity 11 of this invention which uses a length of multi-mode amplifying fiber 13 within the cavity to produce ultra-short, high-power optical pulses. As used herein, "ultra-short" means a pulse width below 100 ps. The fiber 13, in the example shown, is a 1.0 m length of non-birefringent $Yb^{3+}/Er^{3+}$-doped multi-mode fiber. Typically, a fiber is considered multi-mode when the V-value exceeds 2.41, i.e., when modes in addition to the fundamental mode can propagate in the optical fiber. This fiber is coiled onto a drum with a diameter of 5 cm, though bend diameters as small as 1.5 cm, or even smaller, may be used without inhibiting mode-locking. Due to the $Er^{3+}$ doping, the fiber core in this example has an absorption of approximately 40 dB/m at a wavelength of 1.53 $\mu$m. The $Yb^{3+}$co-doping produces an average absorption of 4.3 dB/m inside the cladding at a wavelength of 980 nm. The fiber 13 has a numerical aperture of 0.20 and a core diameter of 16 $\mu$m. The outside diameter of the cladding of the fiber 13 is 200 $\mu$m. The fiber 13 is coated with a low-index polymer producing a numerical aperture of 0.40 for the cladding. A 10 cm length of single-mode Corning Leaf fiber 15 is thermally tapered to produce a core diameter of approximately 14 $\mu$m to ensure an optimum operation as a mode filter, and this length is fusion spliced onto a first end 17 of the multi-mode fiber 13.

In this exemplary embodiment, the cavity 11 is formed between a first mirror 19 and a second mirror 21. It will be recognized that other cavity configurations for recirculating pulses are well known, and may be used. In this example, the mirrors 19, 21 define an optical axis 23 along which the cavity elements are aligned.

The cavity 11 further includes a pair of Faraday rotators 25, 27 to compensate for linear phase drifts between the polarization eigenmodes of the fiber, thereby assuring that the cavity remains environmentally stable. As referenced herein, the phrase "environmentally stable" refers to a pulse source which is substantially immune to a loss of pulse generation due to environmental influences such as temperature drifts and which is, at most, only slightly sensitive to pressure variations. The use of Faraday Rotators for assuring environmental stability is explained in more detail in U.S. Pat. No. 5,689,519 which has been incorporated by reference herein.

A polarization beam-splitter 29 on the axis 23 of the cavity 11 ensures single-polarization operation of the cavity 11, and provides the output 30 from the cavity. A half-wave plate 31 and a quarter-wave plate 33 are used to introduce linear phase delays within the cavity, providing polarization control to permit optimization of polarization evolution within the cavity 11 for modelocking.

To induce mode-locking, the cavity 11 is formed as a Fabry-Perot cavity by including a saturable absorber 35 at the end of the cavity proximate the mirror 19. The saturable absorber 35 is preferably grown as a 0.75 $\mu$m thick layer of InGaAsP on one surface of a substrate. The band-edge of the InGaAsP saturable absorber 39 is preferably chosen to be 1.56 $\mu$m, the carrier life-time is typically 5 ps and the saturation energy density is 100 MW/cm$^2$.

In this example, the substrate supporting the saturable absorber 35 comprises high-quality anti-reflection-coated InP 37, with the anti-reflection-coated surface 39 facing the open end of the cavity 11. The InP substrate is transparent to single-photon absorption of the signal light at 1.56 $\mu$m, however two photon absorption occurs. This two-photon absorber 39 is used as a nonlinear power limiter to protect the saturable absorber 35.

The mirror 19 in this exemplary embodiment is formed by depositing a gold-film onto the surface of the InGaAsP saturable absorber 35 opposite the two photon absorber 39. The combined structure of the saturable absorber 35, two photon absorber 37 and mirror 19 provides a reflectivity of 50% at 1.56 $\mu$m. The surface of the gold-film mirror 19 opposite the saturable absorber 35 is attached to a sapphire window 41 for heat-sinking the combined absorber/mirror assembly.

The laser beam from the fiber 15 is collimated by a lens 43 and refocused, after rotation by the Faraday rotator 25, by a lens 45 onto the anti-reflection-coated surface 39 of the two-photon absorber 37. The spot size of the laser beam on the saturable absorber 35 may be adjusted by varying the position of the lens 45 or by using lenses with different focal lengths. Other focusing lenses 47 and 49 in the cavity 11 aid in better imaging the laser signal onto the multi-mode fiber 13.

Light from a Pump light source 1, such as a laser source, with a wavelength near 980 nm and output power of 5 W, is directed through a fiber bundle 57 with an outside diameter of 375 $\mu$m. This pump light is injected into the end 53 of the multi-mode fiber 13 opposite the single-mode fiber 17. The pump light is coupled into the cavity 11 via a pump signal injector 55, such as a dichroic beam-splitter for 980/1550 nm. Lenses 47 and 48 are optimized for coupling of the pump power from the fiber bundle 57 into the cladding of the multi-mode fiber.

The M$^2$-value of the beam at the output 30 of this exemplary embodiment is typically approximately 1.2. Assuming the deterioration of the M$^2$-value is mainly due to imperfect splicing between the multi-mode fiber 13 and the single-mode mode-filter fiber 15, it can be estimated that the single-mode mode-filter fiber 15 excited the fundamental mode of the multi-mode fiber 13 with an efficiency of approximately 90%.

Mode-locking may be obtained by optimizing the focussing of the laser beam on the saturable absorber 35 and by optimizing the orientation of the intra-cavity waveplates 31, 33 to permit some degree of nonlinear polarization evolution. However, the mode-locked operation of a multi-mode fiber laser system without nonlinear polarization evolution can also be accomplished by minimizing the amount of mode-mixing in the multi-mode fiber 13 and by an optimization of the saturable absorber 35.

Figure 2:
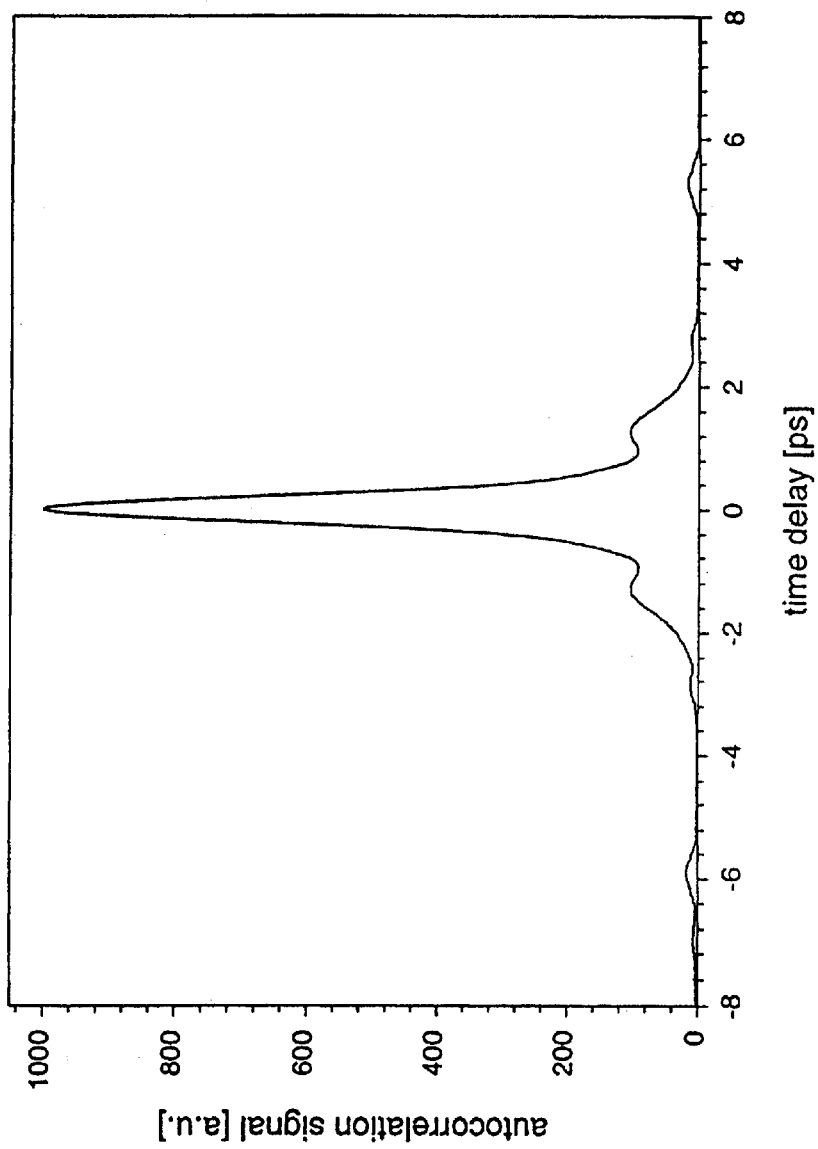
FIG. 2 is a graph showing the typical autocorrelation of pulses generated by the invention of FIG. 1.
Figure 3:
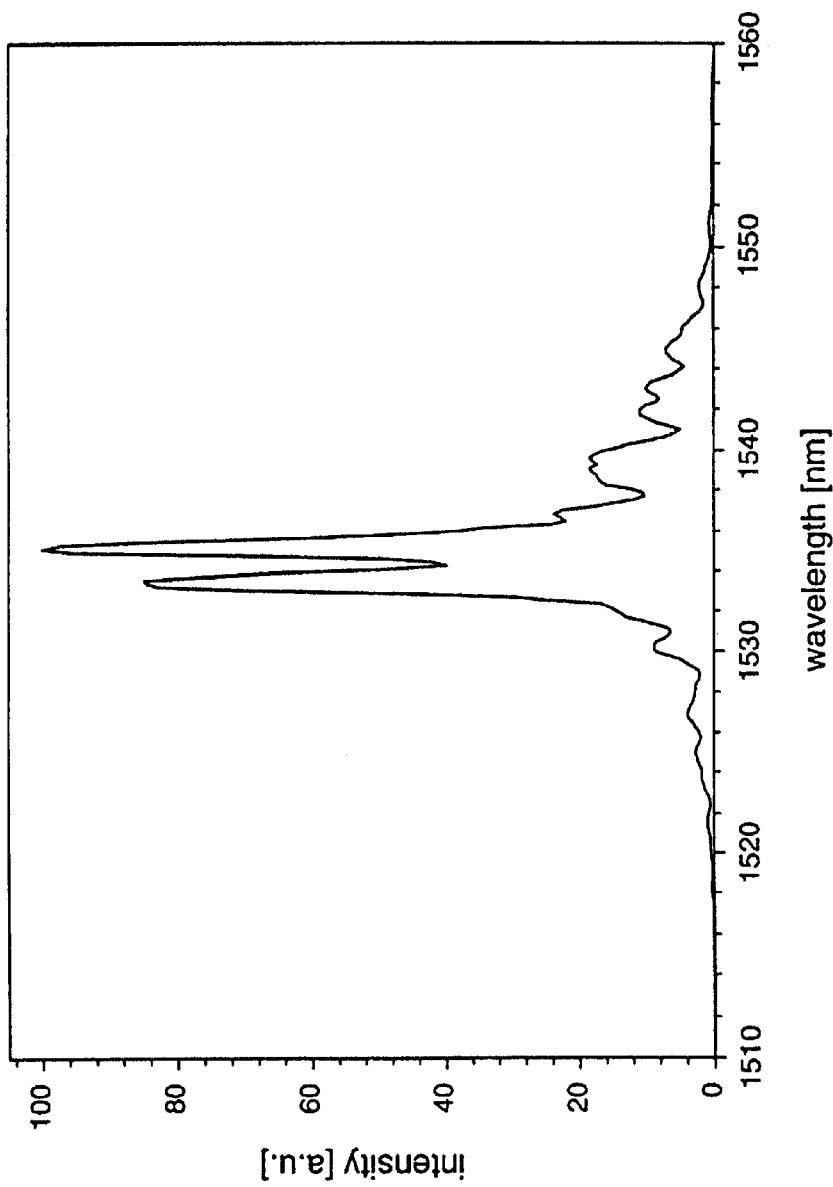
FIG. 3 is a graph showing the typical pulse spectrum generated by the invention of FIG. 1.

The pulses which are generated by the exemplary embodiment of FIG. 1 will have a repetition rate of 66.7 MHz, with an average output power of 300 mW at a wavelength of 1.535 $\mu$m, giving a pulse energy of 4.5 nJ. A typical autocorrelation of the pulses is shown in FIG. 2. A typical FWHM pulse width of 360 fsec (assuming a sech$^2$ pulse shape) is generated. The corresponding pulse spectrum is shown in FIG. 3. The autocorrelation width is within a factor of 1.5 of the bandwidth limit as calculated from the pulse spectrum, which indicates the relatively high quality of the pulses.

Due to the multi-mode structure of the oscillator, the pulse spectrum is strongly modulated and therefore the autocorrelation displays a significant amount of energy in a pulse pedestal. It can be estimated that the amount of energy in the pedestal is about 50%, which in turn gives a pulse peak power of 6 KW, about 6 times larger than what is typically obtained with single-mode fibers at a similar pulse repetition rate.

Neglecting the amount of self-phase modulation in one pass through the multi-mode fiber 13 and any self-phase modulation in the mode-filter 15, and assuming a linear increase of pulse power in the multi-mode fiber 13 in the second pass, and assuming an effective fundamental mode area in the multi-mode fiber 13 of 133 $\mu$m$^2$, the nonlinear phase delay in the multi-mode oscillator is calculated from the first equation above as $\Phi_{nl}$ 1.45$\pi$, which is close to the expected maximum typical nonlinear delay of passively mode-locked lasers.

The modulation on the obtained pulse spectrum as well as the amount of generated pedestal is dependent on the alignment of the mirror 21. Generally, optimized mode-matching of the optical beam back into the fundamental mode of the multi-mode fiber leads to the best laser stability and a reduction in the amount of pedestal and pulse spectrum modulation. For this reason, optimized pulse quality can be obtained by improving the splice between the single-mode filter fiber 15 and the multi-mode fiber 13. From simple overlap integrals it can be calculated that an optimum tapered section of Corning SMF-28 fiber 15 will lead to an excitation of the fundamental mode in the multi-mode fiber 13 with an efficiency of 99%. Thus any signal in higher-order modes can be reduced to about 1% in an optimized system.

Figure 4:
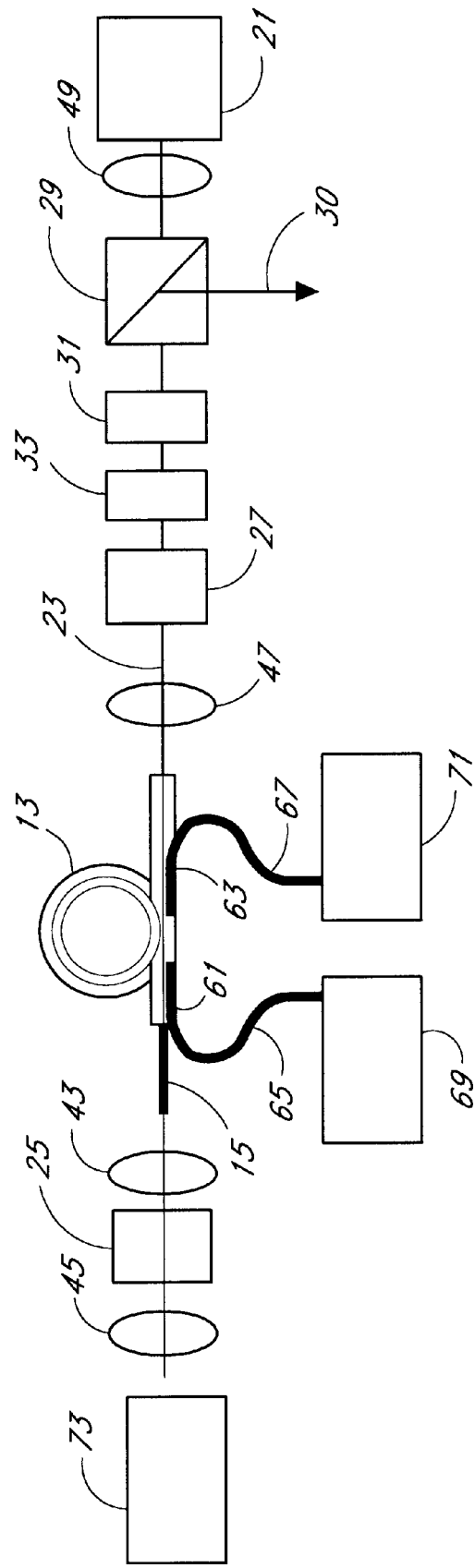
FIG. 4 is a schematic illustration showing the construction of an alternate preferred embodiment utilizing a side-pumping mechanism for injecting pump light into the multi-mode fiber.

An alternate embodiment of the invention is illustrated in FIG. 4. As indicated by the identical elements and reference numbers, most of the cavity arrangement in this figure is identical to that shown in FIG. 1. This embodiment provides a highly integrated cavity 59 by employing a side-pumping mechanism for injecting pump light into the multi-mode fiber 13. A pair of fiber couplers 61, 63, as are well known in the art, inject light from a respective pair of fiber bundles 65 and 67 into the cladding of the multi-mode fiber 13. The fiber bundles are similar to bundle 57 shown in FIG. 1, and convey light from a pair of pump sources 69 and 71, respectively. Alternatively, the fiber bundles 65, 67 and couplers 61, 63 may be replaced with V-groove light injection into the multi-mode fiber cladding in a manner well known in the art. A saturable absorber 73 may comprise the elements 35, 37, 39 and 41 shown in FIG. 1, or may be of any other well known design, so long as it provides a high damage threshold.

Figure 5:
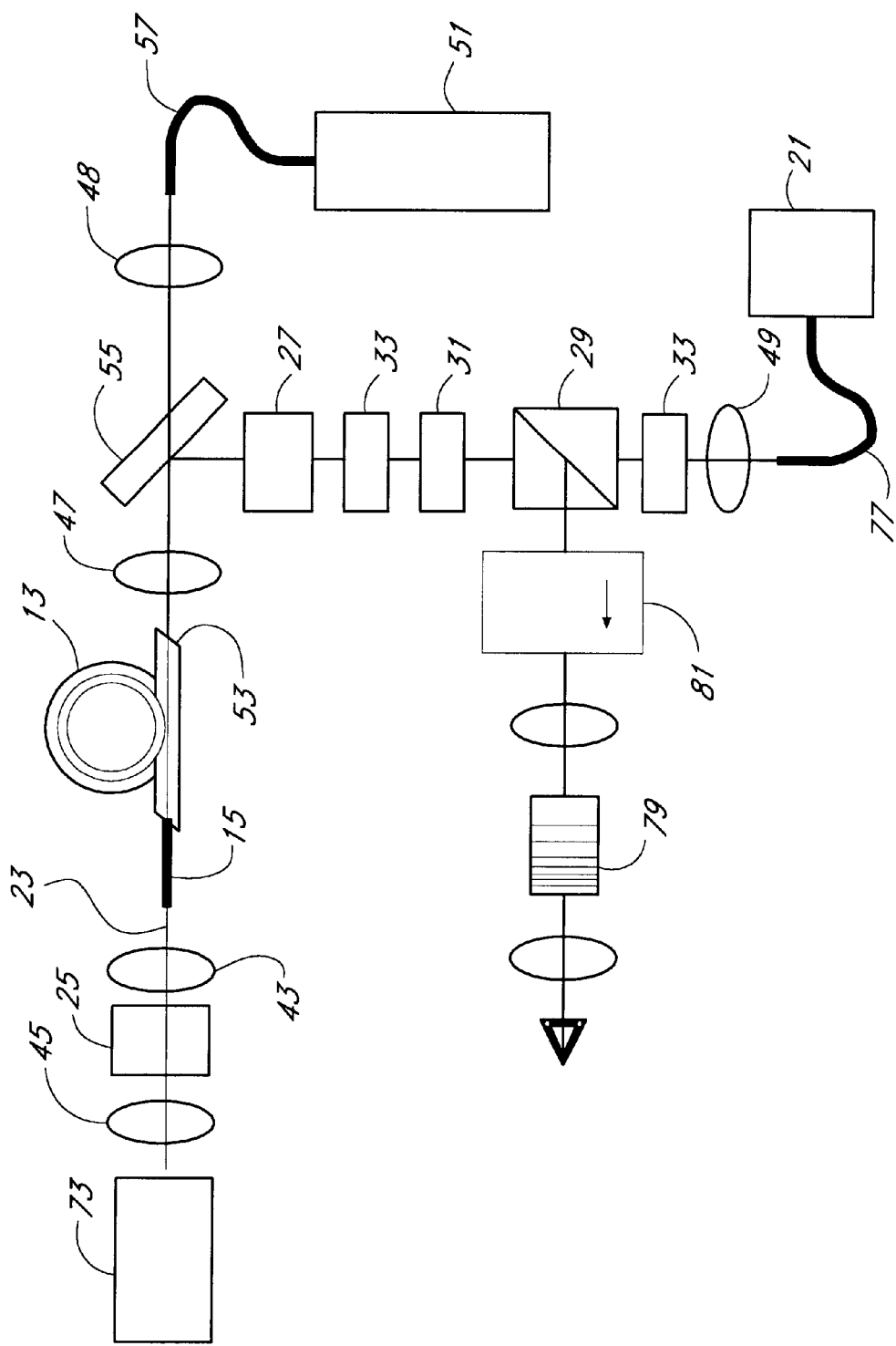
FIG. 5 is a schematic illustration of an alternative embodiment which uses a length of positive dispersion fiber to introduce chirped pulses into the cavity.

In another alternate embodiment of the invention, Illustrated in FIG. 5, the laser cavity 75 includes a positive dispersion element. As With FIG. 4, like reference numbers in FIG. 5 identify elements described in detail with reference to FIG. 1. In this embodiment, a section of single-mode positive dispersion fiber 77 is mounted between the second mirror 21 and the lens 49. In a similar manner, a section of positive dispersion fiber could be spliced onto the end 53 of the multi-mode fiber 13, or the end of the single-mode mode-filter 15 facing the lens 43. Positive dispersion fibers typically have a small core area, and may limit the obtainable pulse energy from a laser. The embodiment shown in FIG. 5 serves to reduce the peak power injected into the positive dispersion fiber 77, and thus maximize the pulse energy output. This is accomplished by extracting, at the polarization beam splitter 29, as much as 90–99% of the light energy.

In the embodiment of FIG. 5, the total dispersion inside the cavity may be adjusted to be zero to generate high-power pulses with a larger bandwidth. Alternatively, by adjusting the total cavity dispersion to be positive, chirped pulses with significantly increased pulse energies may be generated by the laser.

The use of two single-mode mode-filter fibers 15, 77 is also beneficial in simplifying the alignment of the laser. Typically, to minimize modal speckle, broad bandwidth optical signals need to be used for aligning the mode-filter fibers with the multi-mode fiber. The use of two mode-filter fibers 15, 77 allows the use of amplified spontaneous emission signals generated directly in the multi-mode fiber for an iterative alignment of both mode-filters 15, 77.

The chirped pulses generated in the cavity 75 with overall positive dispersion may be compressed down to approximately the bandwidth limit at the frequency doubled wavelength by employing chirped periodically poled $LiNbO_3$ 79 for sum-frequency generation, in a manner well known in the art. The chirped periodically poled $LiNbO_3$ 79 receives the cavity output from the polarization beam splitter 29 through an optical isolator 81. In this case, due to the high power capabilities of multi-mode fiber oscillators, higher frequency-doubling conversion efficiencies occur compared to those experienced with single-mode fiber oscillators. Alternatively, bulk-optics dispersion compensating elements may be used in place of the chirped periodically poled $LiNbO_3$ 79 for compressing the chirped pulses down to the bandwidth limit.

Generally, any nonlinear optical mixing technique such as frequency doubling, Raman generation, four-wave mixing, etc. may be used in place of the chirped periodically poled $LiNbO_3$ 79 to frequency convert the output of the multimode oscillator fiber 13 to a different wavelength. Moreover, the conversion efficiency of these nonlinear optical mixing processes is generally proportional to the light intensity or light intensity squared. Thus, the small residual pedestal present in a multi-mode oscillator would be converted with greatly reduced efficiency compared to the central main pulse and hence much higher quality pulses may be obtained.

Figure 6:
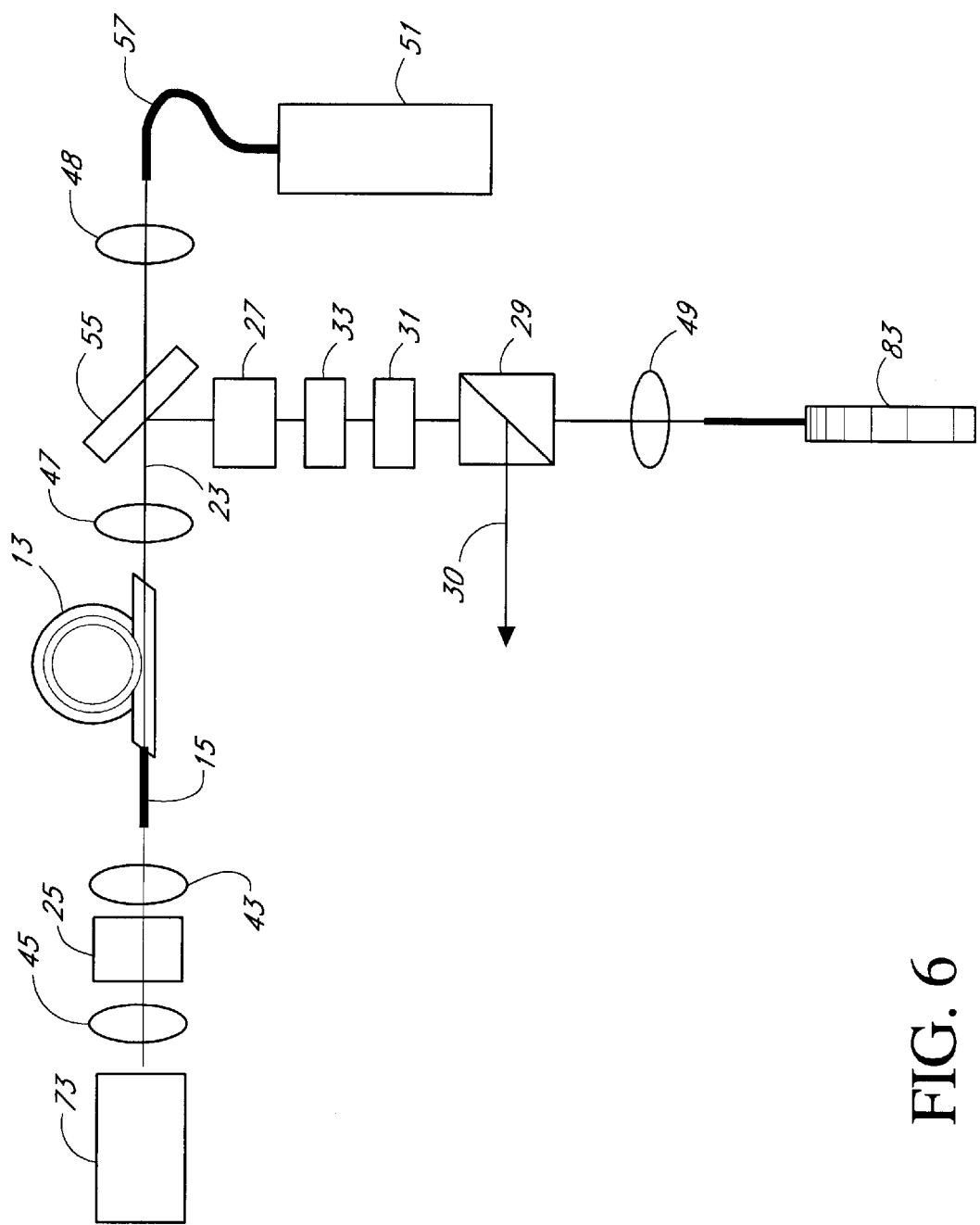
FIG. 6 is a schematic illustration of an alternative embodiment which uses chirped fiber gratings with negative dispersion in the laser cavity to produce high-energy, near bandwidth-limited pulses.

As shown in the alternate embodiment of FIG. 6, very high-energy optical pulses may also be obtained by inserting a chirped fiber grating such as a Bragg grating 83, with negative dispersion, into the cavity 85. Such a system typically produces ps length, high-energy, approximately bandwidth-limited pulses. Due to the multi-mode fiber used, much greater peak powers compared to single-mode fiber oscillators are generated. Here the fiber grating 83 is inserted after the polarization beam splitter 29 to obtain an environmentally-stable cavity even in the presence of non-polarization maintaining multi-mode fiber 13.

In each of the embodiments of this invention, it is advantageous to minimize saturation of the multi-mode fiber amplifier 13 by amplified spontaneous emission generated in higher-order modes. This may be accomplished by confining the rare-earth doping centrally within a fraction of the core diameter.

Figure 7B:
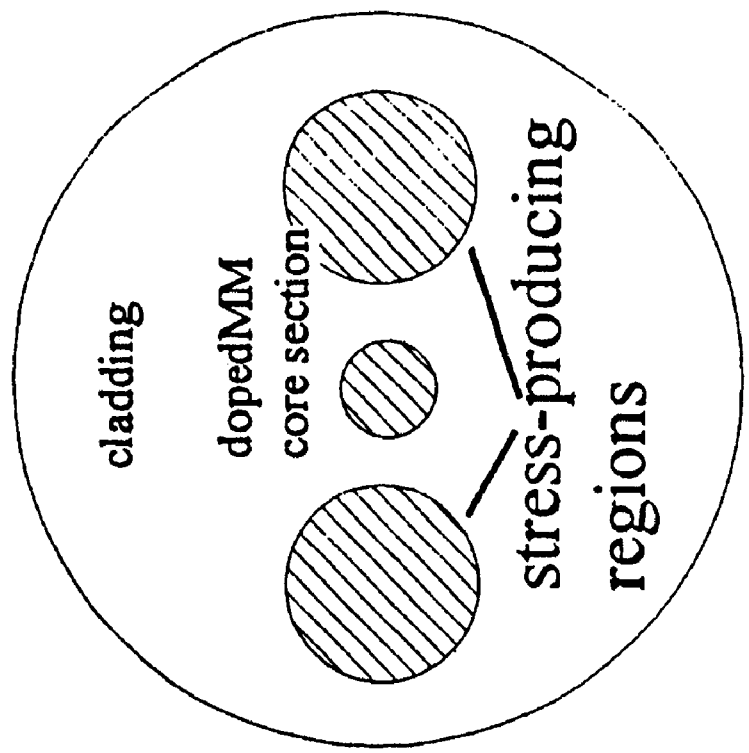
FIGS. 7a and 7b illustrate polarization-maintaining multi-mode fiber cross sections which may be used to construct environmentally stable cavities in the absence of Faraday rotators.
Figure 7A:
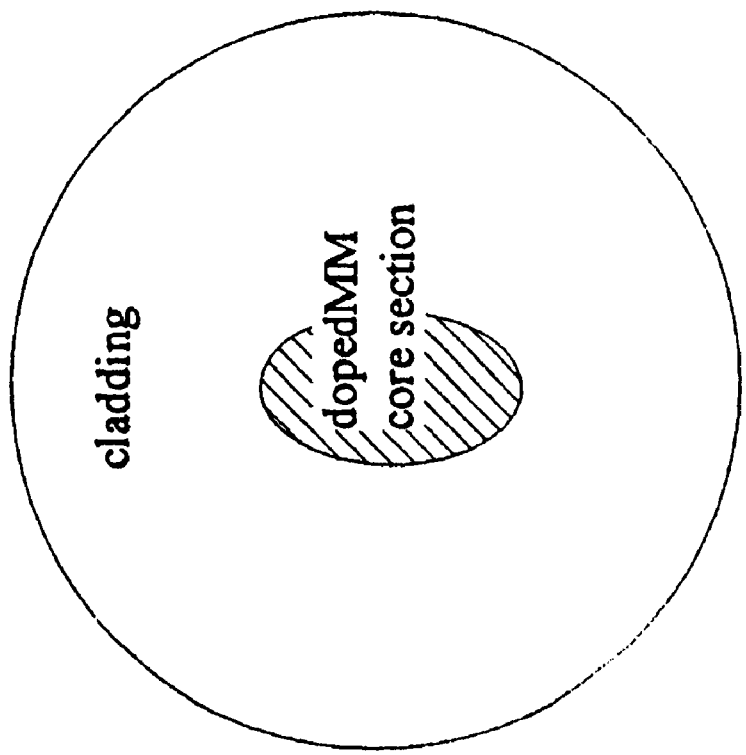
Figure 8:
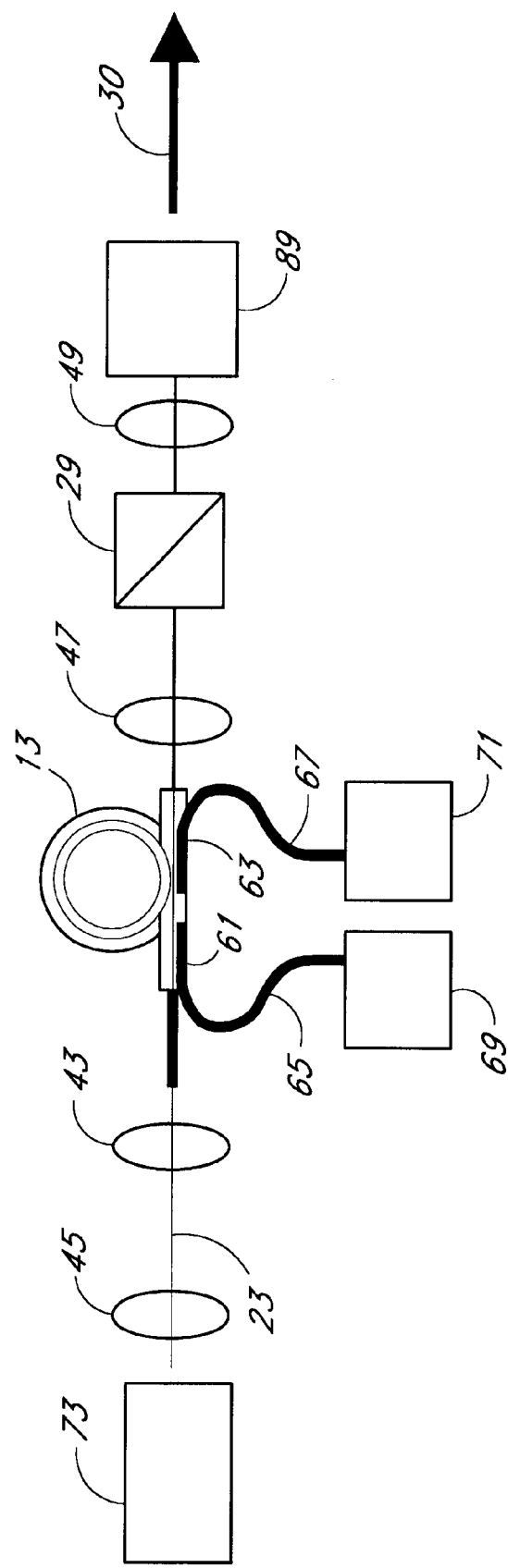
FIG. 8 is a schematic illustration of an alternative embodiment which utilizes one of the fibers illustrated in FIGS. 7a and 7b.

Polarization-maintaining multi-mode optical fiber may be constructed by using an elliptical fiber core or by attaching stress-producing regions to the multi-mode fiber cladding. Examples of such fiber cross-sections are shown in FIGS. 7a and 7b, respectively. Polarization-maintaining multi-mode fiber allows the construction of environmentally stable cavities in the absence of Faraday rotators. An example of such a design is shown in FIG. 8 in this case, the output of the cavity 87 is provided by using a partially-reflecting mirror 89 at one end of the cavity 87, in a manner well known in this art.

Figure 9A:
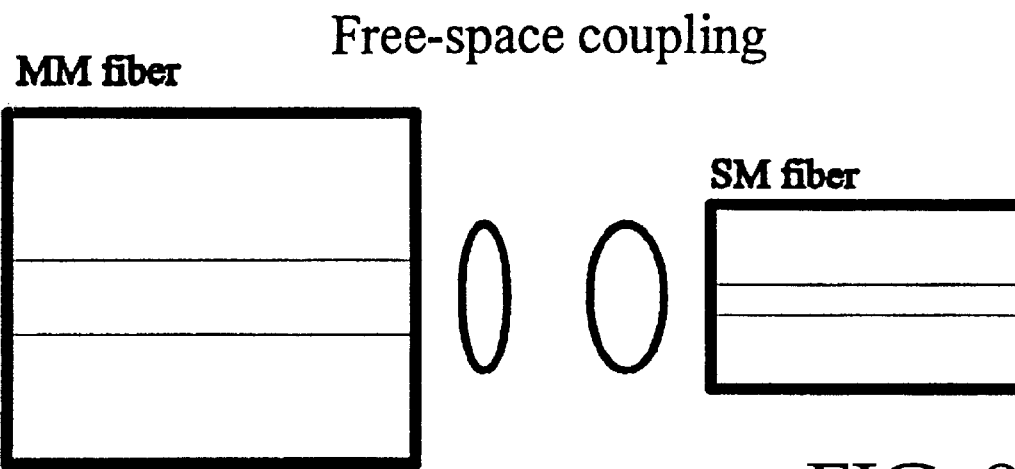
FIGS. 9a, 9b and 9c illustrate the manner is which the fundamental mode of the multi-mode fibers of the present invention may be matched to the mode of a singe mode fiber. These include a bulk optic imaging system, as shown in FIG. 9a, a multi-mode to single-mode splice, as shown in FIG. 9b, and a tapered section of multi-mode fiber, as illustrated in FIG. 9c.
Figure 9B:
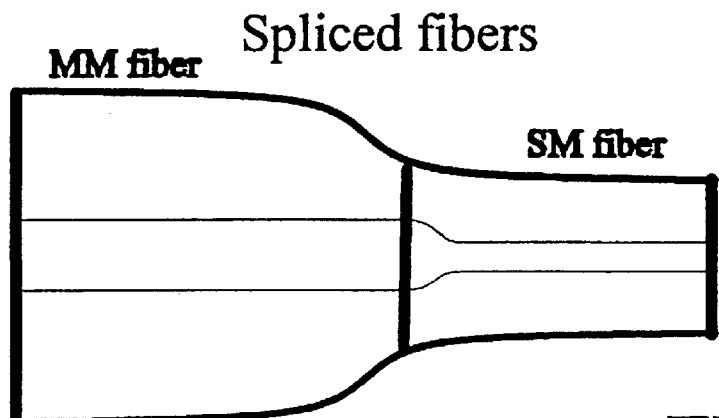
Figure 9C:
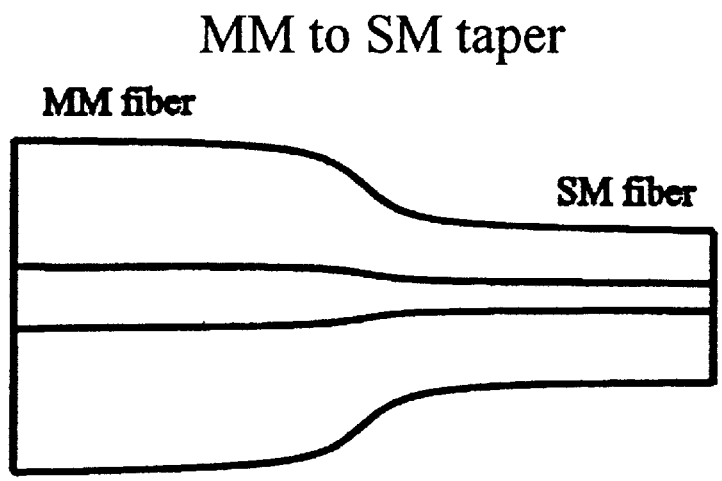
Figure 10:
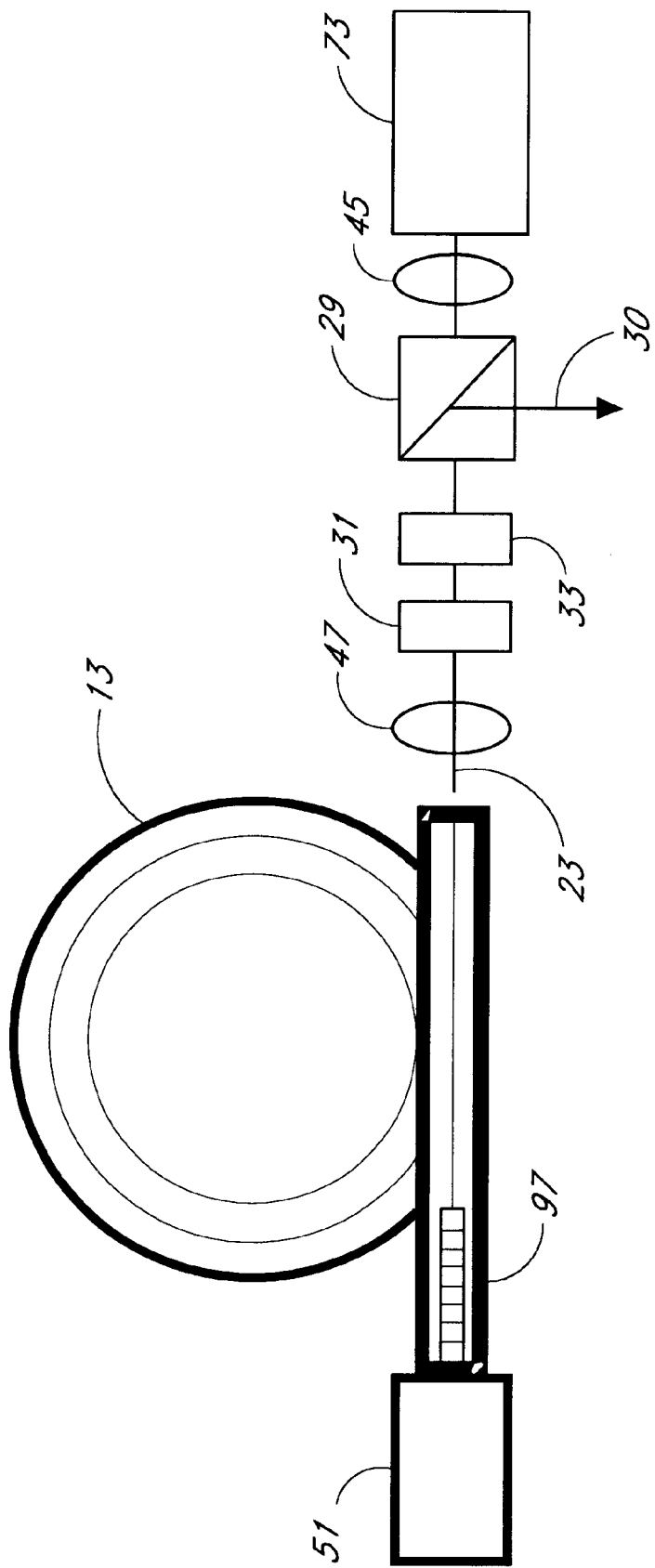
FIG. 10 is a schematic illustration of an alternative embodiment in which a fiber grating is used to predominantly reflect the fundamental mode of a multi-mode fiber.

To ensure optimum matching of the fundamental mode of the multi-mode fiber 13 to the mode of the single-mode mode-filter fiber 15 in each of the embodiments of this invention, either a bulk optic imaging system, a splice between the multi-mode fiber 13 and the single-mode fiber 15, or a tapered section of the multi-mode fiber 13 may be used. For example, the multi-mode fiber 13, either in the form shown in one for FIG. 7a and FIG. 7b or in a non-polarization maintaining form may be tapered to an outside diameter of 70 $\mu$m. This produces an inside core diameter of 5.6 $\mu$m and ensures single mode operation of the multi-mode fiber at the tapered end. By further employing an adiabatic taper, the single-mode of the multi-mode fiber may be excited with nearly 100% efficiency. A graphic representation of the three discussed methods for excitation of the fundamental mode in an multi-mode fiber 13 with a single-mode fiber mode-filter 15 is shown in FIGS. 9a, 9b and 9c, respectively. The implementation in a cavity design is not shown separately, but the splice between the single-mode fiber 15 and the multi-mode fiber 15 shown in any of the disclosed embodiments may be constructed with any of the three alternatives shown in these figures.

Figure 11:
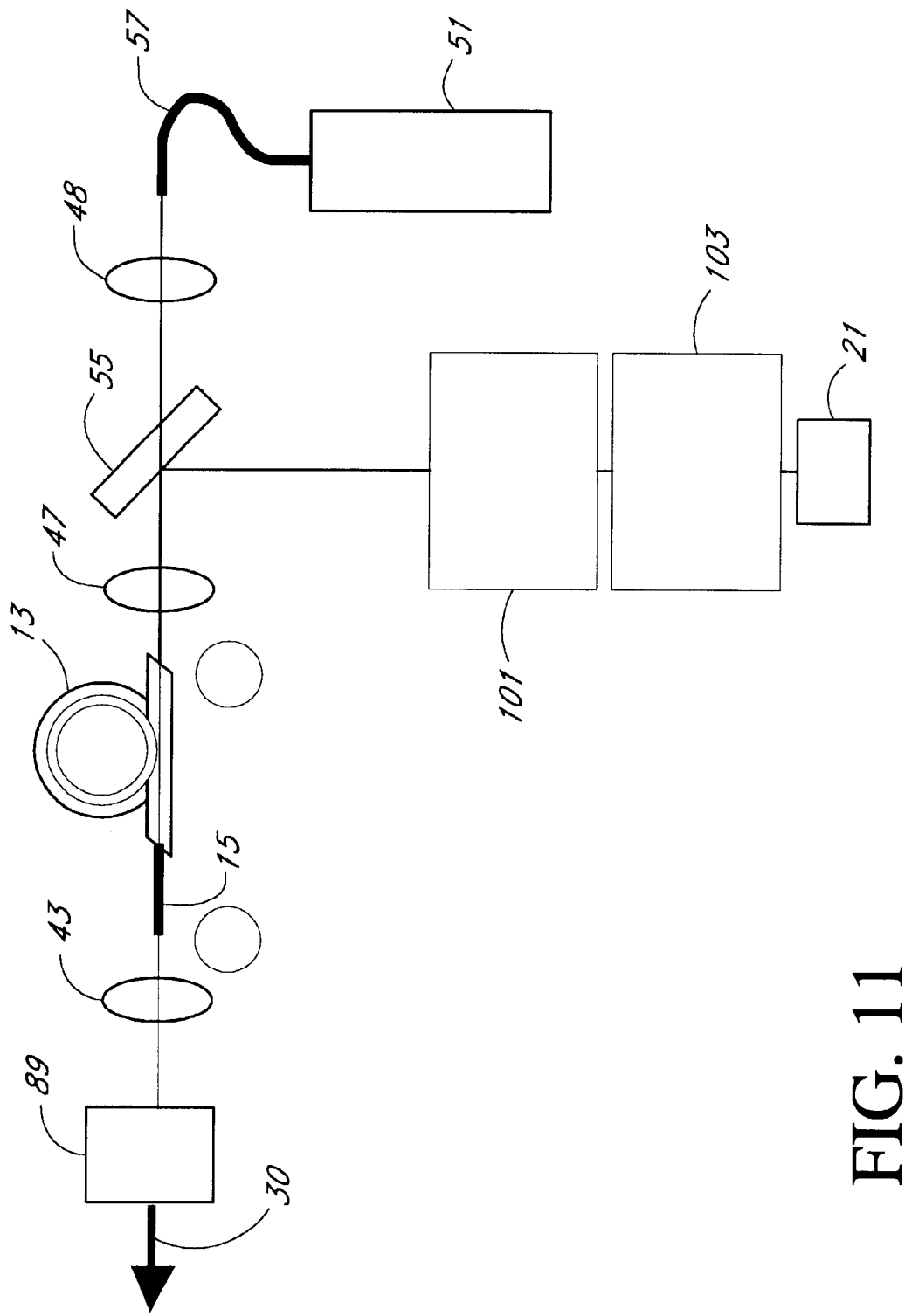
FIG. 11 is a schematic illustration of an alternative embodiment in which active or active-passive modelocking is used to mode-lock the multi-mode laser.

FIG. 11 shows an additional embodiment of the invention. Here, instead of single-mode mode-filter fibers 15 as used in the previous embodiments, fiber gratings such as a Bragg grating directly written into the multi-mode fiber 13 is used to predominantly reflect the fundamental mode of the multi-mode fiber 13. Light from the pump 1 is injected through the fiber grating 97 to facilitate a particularly simple cavity design 99. Both chirped fiber gratings 97 as well as unchirped gratings can be implemented. Narrow bandwidth (chirped or unchirped) gratings favor the oscillation of pulses with a bandwidth smaller than the grating bandwidth.

Finally, instead of passive mode-locking, active mode-locking or active-passive mode-locking techniques may be used to mode-lock multi-mode fibers. For example, an active-passive mode-locked system could comprise an optical frequency or amplitude modulator (as the active mode-locking mechanism) in conjunction with nonlinear polarization evolution (as the passive mode-locking mechanism) to produce short optical pulses at a fixed repetition rate without a saturable absorber. A diagram of a mode-locked multi-mode fiber 13 with a optical mode-locking mechanism 101 is shown in FIG. 11. Also shown is an optical filter 103, which can be used to enhance the performance of the mode-locked laser 105.

Generally, the cavity designs described herein are exemplary of the preferred embodiments of this invention. Other variations are obvious from the previous discussions. In particular, optical modulators, optical filters, saturable absorbers and a polarization control elements are conveniently inserted at either cavity end. Equally, output coupling can be extracted at an optical mirror, a polarization beam splitter or also from an optical fiber coupler attached to the single-mode fiber filter 15. The pump power may also be coupled into the multi-mode fiber 13 from either end of the multi-mode fiber 13 or through the side of the multi-mode fiber 13 in any of the cavity configurations discussed. Equally, all the discussed cavities may be operated with any amount of dispersion. Chirped and unchirped gratings may be implemented at either cavity end to act as optical filters and also to modify the dispersion characteristics of the cavity.

What is claimed is:

1. A method of generating ultra-short pulses, comprising:

providing a length of optical fiber doped with a gain medium;

repeatedly passing signal light through said length of optical fiber to produce said ultra-short pulses; and providing sufficient stored energy within said gain medium to amplify said pulses to a peak power above 1 KW.

2. A method of generating ultra-short pulses as defined in claim 1 additionally comprising:

environmentally stabilizing said optical fiber.

3. A method of generating ultra-short pulses as defined in claim 1 additionally comprising modelocking said optical fiber.

4. A method of generating ultra-short pulses as defined in claim 1 wherein said providing step comprises providing a multi-mode fiber doped with a gain medium.

* * * * *